(12) United States Patent
Sawant et al.

(10) Patent No.: US 10,867,302 B2
(45) Date of Patent: Dec. 15, 2020

(54) EMITTER RECOGNITION AND SEQUENCING FOR RISK ANALYTICS

(71) Applicant: CA, Inc., New York, NY (US)

(72) Inventors: Yashwant Ramkishan Sawant, Parbhani (IN); Sandeep Banisetti, Srikakulam (IN); Mohammed Mujeeb Kaladgi, Kavalbyrasandra (IN); Junaid Ahmed Jameel, Bangalore (IN)

(73) Assignee: CA, Inc., New York, NY (US)

( * ) Notice: Subject to any disclaimer, the term of this patent is extended or adjusted under 35 U.S.C. 154(b) by 751 days.

(21) Appl. No.: 15/592,457

(22) Filed: May 11, 2017

(65) Prior Publication Data

US 2018/0330377 A1 Nov. 15, 2018

(51) Int. Cl.
*G06F 21/00* (2013.01)
*G06Q 20/40* (2012.01)
*G06Q 20/32* (2012.01)
*G06Q 40/02* (2012.01)
*H04W 4/021* (2018.01)
*H04W 84/12* (2009.01)
*H04W 4/80* (2018.01)
*H04W 4/029* (2018.01)

(52) U.S. Cl.
CPC ..... *G06Q 20/4014* (2013.01); *G06Q 20/3224* (2013.01); *G06Q 20/3278* (2013.01); *G06Q 20/4016* (2013.01); *G06Q 40/02* (2013.01); *H04W 4/022* (2013.01); *H04W 4/029* (2018.02); *H04W 4/80* (2018.02); *H04W 84/12* (2013.01)

(58) Field of Classification Search
CPC .......... G06N 3/08; G06N 3/04; G06N 3/0454; G06N 5/025; G06N 20/20
See application file for complete search history.

(56) References Cited

U.S. PATENT DOCUMENTS

| | | | |
|---|---|---|---|
| 2015/0120559 A1* | 4/2015 | Fisher | G06Q 20/4014 705/44 |
| 2016/0080486 A1 | 3/2016 | Ram et al. | |
| 2017/0213206 A1* | 7/2017 | Shearer | G06Q 20/3829 |

* cited by examiner

*Primary Examiner* — Ghazal B Shehni
(74) *Attorney, Agent, or Firm* — Morgan, Lewis & Bockius LLP (57) ABSTRACT

A method includes determining a match score indicative of similarities between (1) signal information associated with a current route being traveled by a user in connection with a transaction with a merchant and (2) signal information associated with an established route traveled by the user in connection with a previous transaction between the user and the merchant, wherein the signal information comprises signal signatures that identify one or more signal emitters identified along each route. The method also includes determining whether the current route matches the established route based on whether the match score is above a threshold. The method further includes if the match score is below the threshold, transmitting a message indicating that the user was not authenticated.

20 Claims, 4 Drawing Sheets

EMITTER RECOGNITION AND SEQUENCING FOR RISK ANALYTICS

BACKGROUND

The present disclosure relates to risk analytics, and specifically to emitter recognition and sequencing for risk analytics.

BRIEF SUMMARY

According to an aspect of the present disclosure, a method may include determining a match score indicative of similarities between (1) signal information associated with a current route being traveled by a user in connection with a transaction with a merchant and (2) signal information associated with an established route traveled by the user in connection with a previous transaction between the user and the merchant, wherein the signal information comprises signal signatures that identify one or more signal emitters identified along each route. The method may also include determining whether the current route matches the established route based on whether the match score is above a threshold. The method may further include if the match score is below the threshold, transmitting a message indicating that the user was not authenticated.

Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements of a non-limiting embodiment of the present disclosure.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C #, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Each activity in the present disclosure may be executed on one, some, or all of one or more processors. In some non-limiting embodiments of the present disclosure, different activities may be executed on different processors.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

Risk analytics processes generally collect information associated with transactions and use that information to verify the propriety of those transactions. Certain risk analytics processes may use existing transaction information or underlying data in order to determine whether particular transaction patterns indicate fraudulent activity associated with a user account. For example, if a user uses a credit card for an in-person transaction (card-present) with a merchant in New York, and then five minutes later uses the same card for an in-person transaction with a merchant in California, a risk analytics process may flag these transactions as potentially fraudulent. Transactions result in the collection of data. Risk analytics processes can use transaction information in a minimally invasive manner in order to recognize and detect potentially fraudulent or otherwise inappropriate transactions before they might otherwise be detected, such as by manual user or card issuer review.

Electronic commerce has enabled advances in risk analytics processes by increased ease of transaction monitoring. More data sets are now available for use in verifying the propriety of transactions than ever before. Most or all of these data sets use information regarding events associated with transactions to verify the propriety of those transactions.

Moreover, technology has advanced to the point where mobile phones or other mobile personal electronic devices have multiple radio frequency (RF) or other spectrum emitters and detectors. For example, a modern cell phone may have signal emitters and detectors for BLUETOOTH, WI-FI, RFID, and other wireless data transmission protocols. To this point, a user encounters interrogating signals from many other emitters. Often, low level communications occur between the interrogative emitters and a mobile device without the user knowing. For example, wireless networks that broadcast a SSID may contain identifying information including the SSID or name of a wireless network. The name may be determined by the mobile device without alerting the user. However, when the user opens a specific interface, the device may display a list of networks that are available for the user to connect to. The list may include the broadcasted SSIDs of all networks that are in range. The same may occur for other communication protocols. Thus, the mobile device may be capable of collecting identifying information for one or more networks that are in range without actually connecting to any of those networks.

This increased accessibility to and identification of signal emitters and sophisticated passive signal detection capabilities of modern devices can be leveraged as risk analytics metrics to increase the data set by which non-invasive risk-analytics may occur, thus increasing transaction security and potentially decreasing provider costs and user transaction expenses without interrupting normal transaction workflows.

In particular embodiments, a series of signal information is established in relationship to a user's previous interactions with a particular merchant location. For example, information regarding ambient networks or other signal emitters is passively received and recorded by a user device in connection with a transaction. This information and recording may be continuous or be stored in a limited buffer, for example, for the past hour or day. In certain embodiments, the information is recorded locally on the mobile device and is not shared with any other entity until a transaction is processed to minimize invasiveness. In certain embodiments, the signal information is anonymized on the mobile device before being transmitted to the carrier for risk analytic operations. For example, a mobile device, such as a mobile phone with one or more radio receivers (i.e., a mobile phone with WI-FI, BLUETOOTH, NFC, RFID, or other wireless or wired communication receivers) records a chronological series of signal emitters encountered leading up to a transaction. The device may continuously record this information. Thus, the device may record information regarding the user getting in a car and leaving his/her house. This may be detected or recorded as recording a home wireless network broadcast or connection followed by signals emitted by the user's car. For example, the car may transmit BLUETOOTH interrogating frequencies in order to connect the mobile device to the car's audio system for hands free calling and audio playback. In certain embodiments, the strength of the signals may be recorded. For example, the presence of the BLUETOOTH interrogating frequencies while the user's home network frequencies are getting weaker and weaker may indicate that the user is leaving his/her house. Moreover, other ambient signals may be detected or encountered as the user leaves his/her home. For example, a trail of neighbors WI-FI network signals may be encountered. In certain embodiments, some signals are associated with networks that have been registered with a particular geolocation. For example, a public WI-FI network is associated with a public shopping center or park. The geolocation of the public location is known, and thus the user can be mapped to the geolocation of the public location. Furthermore, this information may be obtained without utilizing a GPS module of the mobile device. For example, the GPS module may consume a lot of battery. Thus, in addition to network names and characteristics of network signals, location information for the user may be obtained without the power costs associated with constant GPS use. In certain embodiments, no location information is obtained and only network identifying information is used.

In certain embodiments, the mobile device continues to log the sequence of signal information encountered by the user device while the user engages in a transaction with a merchant. For example, the user may continue driving to a shopping mall and purchase a product from a department store. The transaction may be initiated by the user using a credit card. In certain embodiments, the transaction can be initiated by the user with the mobile device. For example, the user can use a personal credit card that has been registered with a mobile payment service such as APPLE PAY, MASTERPASS, VISA CHECKOUT, or the like.

Those of ordinary skill in the art will appreciate the various methods by which the signal information may be verified in accordance with the present disclosure. While certain example systems and methods are described in detail herein, these flows are merely exemplary in nature and are not fully inclusive of all possible transaction flows that are contemplated by the present disclosure.

In a particular embodiment, the signal information is transmitted to a verification service in connection with the transaction. As discussed above, the transaction verification may be performed before, during, or well after a transaction is initiated. For example, signal information may continue to be collected while the user leaves the store, as the user passes other known and unknown signal emitters such as WI-FI networks. The mobile device may continue to collect signal information for 30 minutes, 1 hour, 1 day, or for some longer or shorter period of time before a user validation is performed.

In certain embodiments, the recorded or stored information is transmitted to a verification service that verifies the identity of the transacting user. For example, a sequence of the signals encountered by the user or mobile device is compared against a sequence of known signals that are associated with the user, the merchant, or both. The comparison may include determining a match score that determined a strength of the similarities between the signals encountered during the current transaction and the signals associated with other known transactions with that merchant. For example, if the user generally interacts with a particular physical location of a merchant by leaving his/her house, driving to the mall to purchase something from the user, and then driving home, the signals (and, in certain embodiments, the sequence or order in which those signals or networks are encountered) are compared against an established route (as identified by the signals or networks previously encountered) of the user in connection with that merchant. As another example, if a user typically leaves his/her office to purchase lunch from a merchant, the signals encountered by the device may include a work network of the user, several WI-FI networks of shops along the user's route to the merchant, the merchant WI-FI network, an opposite sequence of those shops encountered along the user's route, and finally the user's work network. Once this route is established as a valid route, the risk analytics processes may verify user identity by recognition of this pattern in the user's signal data.

In certain embodiments, the signal patterns between the established route and the current route may not match identically. However, this is often to be expected. For example, a user that walks to a merchant may encounter new people on his/her way to the merchant. Some people may carry devices that advertise networks. For example, someone may be working in a coffee shop along the route and may have a wireless hotspot device that broadcasts wireless network signals. However, this person cannot be expected to be encountered each time the user purchases something from the merchant. Accordingly, matches between established routes and the current route may be determined with respect to a match score and a match threshold. The score may weigh particular fixed signals as more reliable or constant than others. Furthermore, the strength of each signals weight may grow over time as that signal is increasingly encountered by the user in connection with the transaction. For example, a coffee shop located on the way to the merchant broadcasts a public wireless network. The device detects this signal each time the user makes a purchase at the vendor. The weighting may reflect the relative permanence of this network with respect to transactions. Moreover, the match threshold allows some level of absence of signals. For example, the threshold may be set to 50% or 60% of the signals in the established route. In certain embodiments, the threshold is a number of matching signals, such as at least 10 matching signals. In certain embodiments, the match score accounts for a sequence of the established signals against the current signals. Signals encountered in order may signify a high level of confidence that the user is taking an established route to the merchant and thus may be weighted higher than matching signals encountered that are not in any particular order.

In certain embodiments, the risk analytics process may make a determination as to the propriety of the transaction based on the signal information. The results of this determination may be logged for substantiation by other transactions or may be immediately raised in the form of an alert sent to another device of the user or a bank. For example, the user may be alerted that his or her card has been used to transact with a merchant while traveling in an unrecognized route. The user may simply respond to the message verifying that it was indeed a valid transaction. In this case, the route may be added to a set of established routes for transacting with that merchant. If the user responds that the transaction was not authorized, further action may be taken. In certain embodiments, an unrecognized route may automatically put a hold or alert on the user's account.

The teachings of the present disclosure may reference specific example "device." For example, a "device" may refer to a smartphone, tablet, desktop computer, laptop, Global Positioning System (GPS) device, satellite communication terminal, radio communication terminal, or any other device capable of communications. For example, a mobile device may be equipped with an application capable of communicating with an email system. Any device with such capabilities is contemplated within the scope of the present disclosure.

Figure 1:
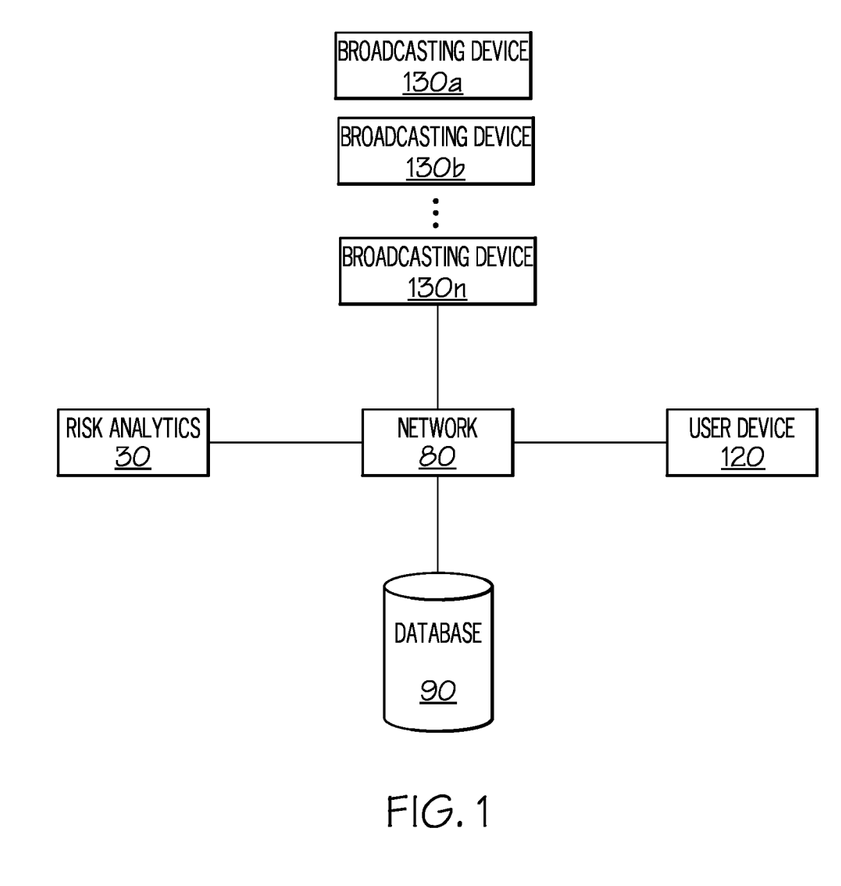
FIG. 1 is a block diagram of a system for emitter recognition and sequencing for risk analytics in accordance with a non-limiting embodiment of the present disclosure.

FIG. 1 is a block diagram of a system for emitter recognition and sequencing for risk analytics in accordance with a non-limiting embodiment of the present disclosure. A risk analytics system 30 may communicate with a database 90 and user device 120 via a network 80. In some non-limiting embodiments of the present disclosure, risk analytics system 30 may directly communicate with user device 120 if risk analytics system 30 is installed on the user device 120. Further, risk analytics system 30 may communicate with a local database 95 that stores user and merchant emitter information in addition to other analytics metrics. User device 120 may be a mobile device running a process capable of communicating with risk analytics system 30. In some non-limiting embodiments, risk analytics system 30 may be installed on the user device 120 as, for example, a plug-in. In some non-limiting embodiments, risk analytics system 30 may be a plug-in for an email application or a mobile application on a user's mobile device.

Network 80 may comprise one or more entities, which may be public, private, or community based. Network 80 may permit the exchange of information and services among users/entities that are connected to such network 80. In certain configurations, network 80 may be a local area network, such as an intranet. Further, network 80 may be a closed and/or private network/cloud in certain configurations, and an open network/cloud in other configurations. Network 80 may facilitate wired or wireless communications of information and provisioning of services among users that are connected to network 80.

Network 80 may comprise one or more clouds, which may be public clouds, private clouds, or community clouds. Each cloud may permit the exchange of information and the provisioning of services among devices and/or applications that are connected to such clouds. Network 80 may include a wide area network, such as the Internet; a local area network, such as an intranet; a cellular network, such as a network using CDMA, GSM, 3G, 4G, LTE, or other protocols; a machine-to-machine network, such as a network using the MQTT protocol; another type of network; or some combination of the aforementioned networks. Network 80 may be a closed, private network, an open network, or some combination thereof and may facilitate wired or wireless communications of information among devices and/or applications connected thereto.

Network 80 may include a plurality of devices, which may be physical devices, virtual devices (e.g., applications running on physical devices that function similarly to one or more physical device), or some combination thereof. The devices within network 80 may include, for example, one or more of general purpose computing devices, specialized computing devices, mobile devices, wired devices, wireless devices, passive devices, routers, switches, mainframe devices, monitoring devices, infrastructure devices, other devices configured to provide information to and/or receive information from service providers and users, and software implementations of such.

In some non-limiting embodiments of the present disclosure, user device 120 may be any type of computer such as, for example, a desktop computer. In other non-limiting embodiments, user device 120 may be a mobile device such as a mobile phone, laptop, tablet, any portable device, etc. Mobile electronic devices may be part of a communication network such as a local area network, wide area network, cellular network, the Internet, or any other suitable network. Mobile devices may be powered by a mobile operating system, such as Apple Inc.'s iOS® mobile operating system or Google Inc.'s Android® mobile operating system, for example. A mobile electronic device may use a communication network to communicate with other electronic devices, for example, to access remotely-stored data, access remote processing power, access remote displays, provide locally-stored data, provide local processing power, or provide access to local displays. For example, networks may provide communication paths and links to servers, which may host email applications, content, and services that may be accessed or utilized by users via mobile electronic devices. The content may include text, video data, audio data, user settings or other types of data. Networks may use any suitable communication protocol or technology to facilitate communication between mobile electronic devices, such as, for example, BLUETOOTH, IEEE WI-FI (802.11a/b/g/n/ac), or Transmission Control Protocol/Internet Protocol (TCP/IP).

In some non-limiting embodiments risk analytics system 30 may use network 80 to communicate with user device 120. In other non-limiting embodiments of the present disclosure, risk analytics system 30 may be installed on the user device 120. Risk analytics system 30 may be fully installed on the user device 120 and work in tandem with an ordering application or website on the user device 120. In some non-limiting embodiments of the present disclosure, risk analytics system 30 may support communications between the user device 120 and another device. In some non-limiting embodiments, user device 120 may represent a plurality of user devices such as, for example, laptops and mobile cellular telephones. In addition, a user may have a plurality of user accounts on each user device 120. Risk analytics system 30 may interact with any of a plurality of user accounts for each user.

The risk analytics system 30 environment may also include a database 90. Database 90 may include, for example, additional servers, data storage, and resources. Risk analytics system 30 may receive from database 90 additional data, user account information, user correspondence history and preferences, contact information, or any data used by risk analytics system 30. Database 90 may be any conventional database or data infrastructure. For example, database 90 may include scaled out data architectures (i.e., Apache Hadoop) and/or persistent, immutable stores/logging systems.

Figure 2:
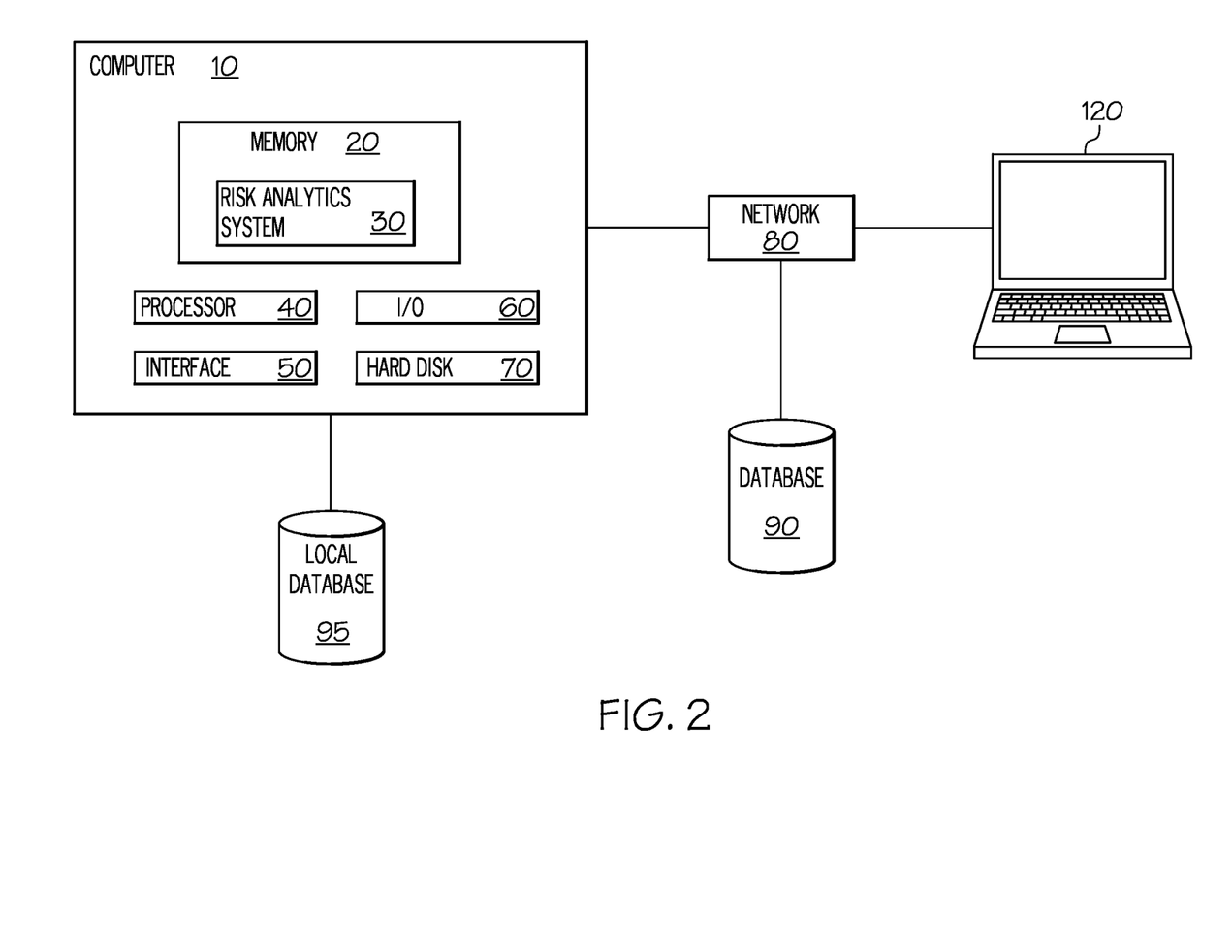
FIG. 2 is a block diagram of a system for emitter recognition and sequencing for risk analytics in accordance with a non-limiting embodiment of the present disclosure.

FIG. 2 displays the risk analytics system 30 of a non-limiting embodiment of the present disclosure. Computer 10 may reside on one or more networks. In some non-limiting embodiments, computer 10 may be located on any device that may receive input from a device, such as, for example, a mobile device or user device 120. Computer 10 may comprise a memory 20, a central processing unit, an input and output ("I/O") device 60, a processor 40, an interface 50, and a hard disk 70. Memory 20 may store computer-readable instructions that may instruct computer 10 to perform certain processes. In particular, memory 20 may store a plurality of application programs that are under development. Memory 20 also may store a plurality of scripts that include one or more testing processes for evaluation of applications or input. When computer-readable instructions, such as an application program or a script, are executed by the CPU, the computer-readable instructions stored in memory 20 may instruct the CPU or risk analytics system 30 to perform a plurality of functions. Examples of such functions are described below with respect to FIGS. 3-4.

In some non-limiting embodiments of the present disclosure, the CPU may be risk analytics system 30. In some implementations, when computer-readable instructions, such as an application program or a script, are executed by the CPU, the computer-readable instructions stored in memory 20 may instruct the risk analytics system 30 to interact with user device 120. Computer 10 may be located on the user device 120, on a remote server, on the cloud, or any combination thereof. In some non-limiting embodiments, Computer 10 and risk analytics system 30 may communicate with user device 120 via network 80. In some non-limiting embodiments, risk analytics system 30 may interact with an email application on the computer 10 to communicate with other devices, such as user device 120. In some non-limiting embodiments, risk analytics system 30 may be located on the user device 120.

I/O device 60 may receive data from network 80, database 90, local database 95, data from other devices and sensors connected to risk analytics system 30, and input from a user and provide such information to the risk analytics system 30. I/O device 60 may transmit data to network 80, database 90, and/or local database 95. I/O device 60 may transmit data to other devices connected to risk analytics system 30, and may transmit information to a user (e.g., display the information, send an e-mail, make a sound) or transmit information formatted for display on a user device 120 or any other device associated with the user. Further, I/O device 60 may implement one or more of wireless and wired communication between user device 120 or risk analytics system 30 and other devices within or external to network 80. I/O device 60 may receive one or more of data from another server or a network 80. The risk analytics system 30 may be a processing system, a server, a plurality of servers, or any combination thereof. In addition, I/O device 60 may communicate received input or data from user device 120 to risk analytics system 30.

Risk analytics system 30 may be located on the cloud, on an external network, on user device 120, or any combination thereof. Risk analytics system 30 may be SaaS or entirely located on the user device 120. Furthermore, some non-limiting configurations of risk analytics system 30 may be located exclusively on a user device 120, such as, for example, a mobile device or tablet. Risk analytics system 30 may also be accessed and configured by a user on user device 120 or any other graphical user interface with access to risk analytics system 30. In some non-limiting embodiments, the user may connect to network 80 to access risk analytics system 30 using the user device 120.

Further referring to FIG. 2, in some non-limiting embodiments of the present disclosure, a mobile application may be installed on the user device 120. The mobile application may facilitate communication with risk analytics system 30, database 90, local database 95, a communications process running on user device 120, or any other entity. In some non-limiting embodiments, a program on user device 120 may track, record, and report input information to the risk analytics system 30, such as, for example, past interactions, login dates and times, delivery requests and corresponding signal data, previous location profiles, user configurations, and corresponding data. In systems and methods of the present disclosure, such as when the risk analytics system 30 is located on user device 120, user device 120 may not be connected to network 80 while in communication with risk analytics system 30.

In some non-limiting embodiments, user device 120 may store data, user preferences and configurations, and any other data associated with the risk analytics system 30 locally on the user device 120. In some non-limiting embodiments of the present disclosure, an application on the user device 120 may communicate with risk analytics system 30 to manage communications, data, and corresponding user input or requests on the user device 120. User device 120 may have a user interface for the user to communicate with risk analytics system 30. An application on the user device 120 and risk analytics system 30 may maintain an offline copy of all information. In some non-limiting embodiments of the present disclosure, in which the risk analytics system 30 is located partially or completely on user device 120, risk analytics system 30 may facilitate communications with other devices. Risk analytics system 30 may also facilitate communications between users via SMS protocol, messaging applications on any device, or any other application used for communication. Risk analytics system 30 may rely on information stored locally on user device 120. In certain embodiments, detected signal information may be stored locally on the user device 120 in addition to privacy preferences, such as a preference regarding anonymizing signal data before sharing that data with authentication servers, on the user device 120. In some systems and methods of the present disclosure, risk analytics system 30 may rely on information such as user preferences and configurations in a cloud database.

Figure 3:
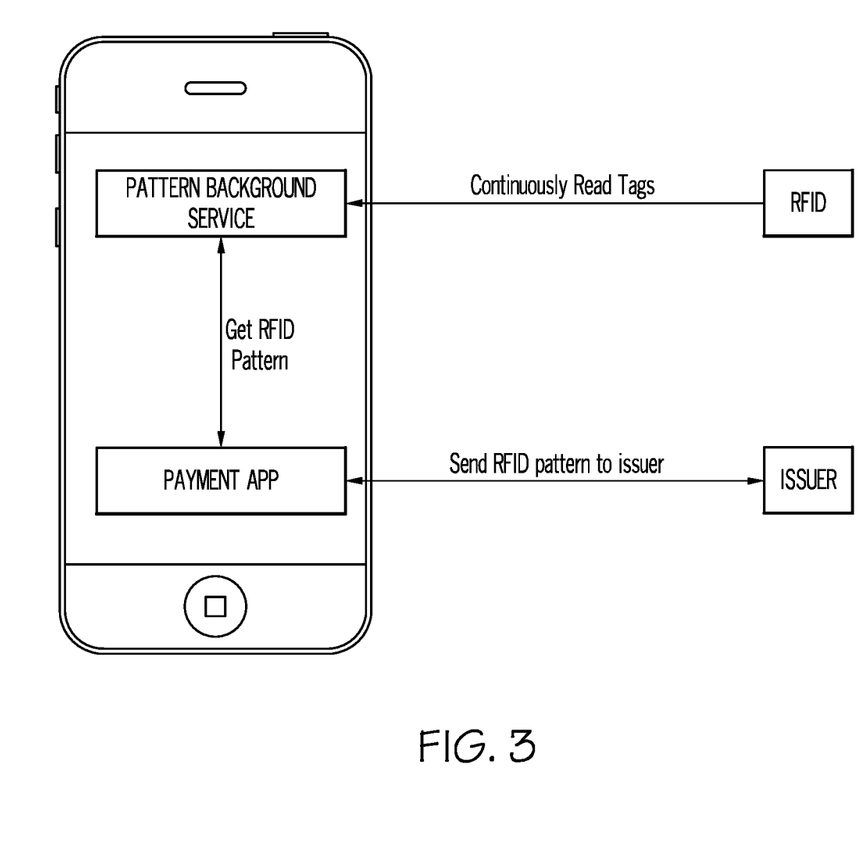
FIG. 3 is a block diagram of a system for emitter recognition and sequencing for risk analytics in accordance with a non-limiting embodiment of the present disclosure.

FIG. 3 illustrates functionality of a risk analytics system according to a non-limiting embodiment of the present disclosure. A user device 120 may initiate or be present during a transaction with a merchant in a physical location of the merchant. A background service 330 on the user device 120 may receive all signals within range of the user device 120. For example, the background service 330 may receive WI-FI signals 300, RFID signals 310, Pixie signals 320, as well as BLUETOOTH signals, radio signals, cell signals, and any other type of signal. Background service 330 may also recognize any hardware tags. In some non-limiting embodiments, background service 330 may include or utilize a portion of hardware within user device 120. Background service 330 may receive signal continuously or only when the user device 120 is used for online shopping or placing an online delivery request.

Background service 330 may develop a route profile with ambient signal data received on the user device 120. In some non-limiting embodiments, background service 330 is located on the cloud. In other non-limiting embodiments, background service 330 is an application located on the user device 120. Ambient signal data may include signal data from a plurality of devices emitting signal within range of the user device 120 that are present along the route that a user travels in order to reach the transaction location or merchant location. In addition to type of signal, background service 330 may determine the strength of each ambient signal. Such information may assist a credit issuer, bank, or payment system in verifying the propriety of a particular transaction. The location profile determined by background service 330 may contain all ambient signal data that the user encounters before and after the user initiates a particular transaction with a merchant. Location profiles may contain any data received or located on a device. Such data may include, for example, GPS data or IP address data. Further, location profiles may include hardware tags with which the user device 120 is within contact. In some non-limiting embodiments, location profiles may include historical location information and data associated with previous communications or previously signal data received by the user device 120. In some non-limiting embodiments, a user device 120 may indicate a previous location profile for delivery if the user device 120 is not located in the preferred delivery location. In some cases, user device 120 may indicate a location profile different device for a delivery location.

After determining the location profile, background service 330 may transmit the location profile to an risk analytics system. In some non-limiting embodiments, the risk analytics system may be associated with a specific merchant. The risk analytics system may also be located on an internal or external network associated with a card issuer or creditor. The risk analytics system receives a transaction notification from a merchant upon initiating the transaction. The merchant sends a transaction information to risk analytics system 30. In some non-limiting embodiments, risk analytics system 30 may also receive the order details from risk analytics system. Order details may include the good or service requested, payment details, address details, specific order instructions, or any other order information.

The risk analytics system may compare ambient signal data from background service 360 to an established set of signal information from previous transactions with the merchant by the user, such as information stored in risk analytics system 30. Risk analytics system 30 may compare strength of received signals and signal type to the established signal information of user device 120 for transactions with that merchant. Through this comparison, risk analytics system 30 may be able to determine whether the user traveled a same or similar route as he or she did during previous transactions with the merchant.

Risk analytics system 30 may, in some non-limiting embodiments, be associated with a website. In some non-limiting embodiments, a user may register a user ID or username along with a password on the website associated with risk analytics system 30. In some non-limiting embodiments, the password is a one-time password. In addition to login information, the user may designate a location and a location profile to associate with the account. Users may designate multiple location profiles associated with respective preferred delivery locations.

Figure 4:
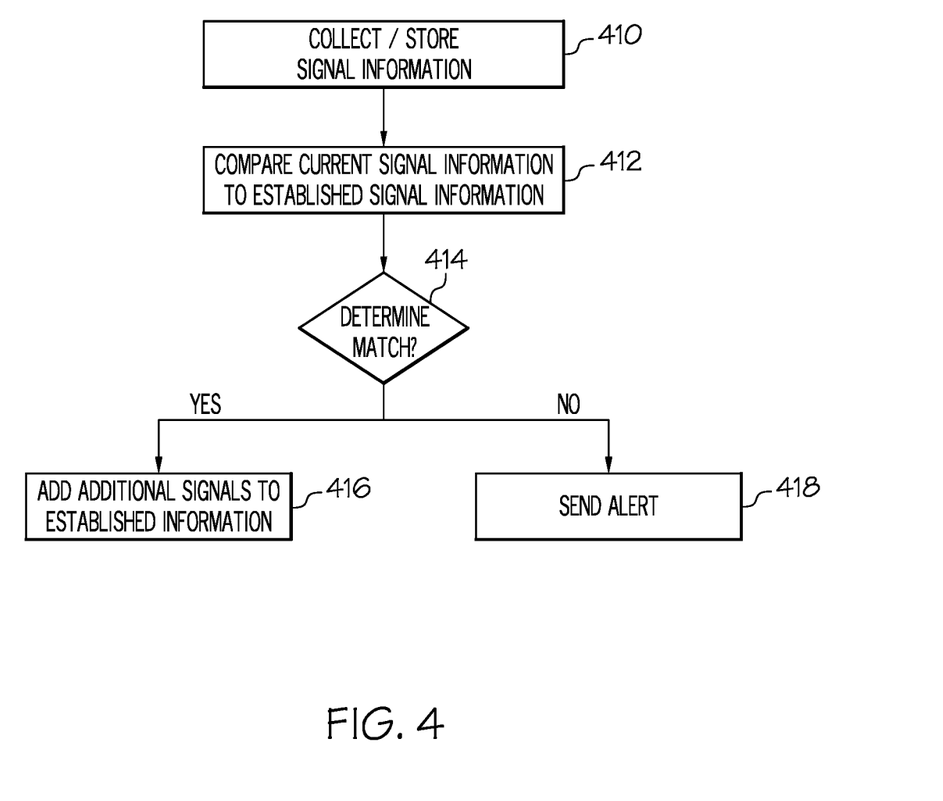
FIG. 4 is a flowchart of a method for emitter recognition and sequencing for risk analytics in accordance with a non-limiting embodiment of the present disclosure.

FIG. 4. is a flow chart of a method for emitter recognition and sequencing for risk analytics in accordance with a non-limiting embodiment of the present disclosure. At step 410, signal information is collected and/or stored by a mobile device associated or registered with a user. As discussed above, the signal information may be collected and stored in a variety of manners. For example, signal information may be collected continuously. As another example, signal information may only be collected and/or stored when a user is determined to be moving. Certain other triggers may be used to store signal information. For example, signal information may be stored when the user is out of range of a home or office network. range. In certain embodiments, the signal information is stored locally or at a risk analytics server. For example, the risk analytics server may collect signal information once a day or once a week. Validation of previous transactions can occur at that time. As another example, signal information is requested and/or transmitted to the risk analytics system on a more frequent basis or in connection with a transaction. For example, a risk analytics process may receive a message indicating that a merchant processed a transaction for a user. The risk analytics process may request signal information from a device associated with the user. The risk analytics process may further wait before requesting signal information from the user in order to verify the user's destination information. Moreover, the system can also be configured so that the risk analytics process turns on a signal monitoring on the user's device in response to receiving the transaction message. For example, the user can request signal information from the user immediately in response to determining that the user entered a transaction. If the route information, as identified by the signal information for the device, does not match the established route or the signal information for the merchant, this may be an indication that the transaction needs further verification.

At step 414, the collected signal information is compared to the signal information for the established route. If a match is detected, then any additional signal information present in the current route is added to the established route information. In certain embodiments, a new set of route information is added to existing sets of established route information. In certain embodiments, signal information present in the established route may be slowly diminished in significance as they fail to be detected in future transactions. For example, the weight applied to those signals may be reduced, or the signal may be completely removed from the set of established signals. In this way, the system may use signal information that has been verified by matching over some predetermined percentage threshold in order to update matching and non-matching signal information in the established data.

However, if a match is not detected, the risk analytics system may take a variety of actions. For example, the risk analytics system may deny the transaction or otherwise stop the transaction from being processed. As another example, the system may merely alert the user or send the user an interactive email that provides the user with an option to negate the transaction or flag it as fraudulent. In certain embodiments, the risk analytics system merely alerts the financial institution, merchant, or transaction host as to the level of impropriety associated with the transaction for vendor follow-up and remedial measures.

The flowcharts and diagrams in FIGS. 1-4 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, "each" means "each and every" or "each of a subset of every," unless context clearly indicates otherwise.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
   determining, by one or more processors, a match score indicative of similarities between (1) signal information associated with a current route being traveled by a user in connection with a transaction with a merchant and (2) signal information associated with an established route traveled by the user in connection with a previous transaction between the user and the merchant, wherein the signal information comprises signal signatures that identify one or more signal emitters identified along each route;
   determining, by the one or more processors, whether the current route matches the established route based on whether the match score is above a threshold; and
   if the match score is below the threshold, transmitting, by the one or more processors, a message indicating that the user was not authenticated.

2. The method of claim 1, wherein the match score is based on a number of matching signal signatures detected along each route.

3. The method of claim 1, wherein the match score is based on an order of matching signal signatures detected along each route.

4. The method of claim 1, wherein each signal information is received from a respective device used to initiate each transaction.

5. The method of claim 1, further comprising:
   determining that the signal information associated with the transaction includes a signal signature for an additional signal emitter detected along the current route that was not detected along the established route; and
   if the match score is above the threshold, adding the signal signature for the additional signal emitter to the signal information associated with the established route.

6. The method of claim 1, wherein determining whether the current route matches the established route further comprises determining whether a starting point of the current route matches an established address of the user.

7. The method of claim 1, wherein determining whether the current route matches the established route further comprises determining whether an end point of the current route matches an established address of the user.

8. The method of claim 7, wherein the established address of the user is:
   a home address; or
   a work address.

9. The method of claim 1, further comprising:
   receiving a response from the user verifying the transaction; and
   adding the current route as another established route.

10. The method of claim 1, wherein the signal emitters comprise a WI-FI signal emitter.

11. A computer configured to access a storage device, the computer comprising:
    a processor; and
    a non-transitory, computer-readable storage medium storing computer-readable instructions that when executed by the processor cause the computer to perform:
    determining a match score indicative of similarities between (1) signal information associated with a current route being traveled by a user in connection with a transaction with a merchant and (2) signal information associated with an established route traveled by the user in connection with a previous transaction between the user and the merchant, wherein the signal information comprises signal signatures that identify one or more signal emitters identified along each route;
    determining whether the current route matches the established route based on whether the match score is above a threshold; and
    if the match score is below the threshold, transmitting a message indicating that the user was not authenticated.

12. The computer of claim 11, wherein the match score is based on a number of matching signal signatures detected along each route.

13. The computer of claim 11, wherein the match score is based on an order of matching signal signatures detected along each route.

14. The computer of claim 11, wherein each signal information is received from a respective device used to initiate each transaction.

15. The computer of claim 11, wherein the processor further causes the computer to perform:
    determining that the signal information associated with the transaction includes a signal signature for an additional signal emitter detected along the current route that was not detected along the established route; and
    if the match score is above the threshold, adding the signal signature for the additional signal emitter to the signal information associated with the established route.

16. The computer of claim 11, wherein determining whether the current route matches the established route further comprises determining whether a starting point of the current route matches an established address of the user.

17. The computer of claim 11, wherein determining whether the current route matches the established route further comprises determining whether an end point of the current route matches an established address of the user.

18. The computer of claim 17, wherein the established address of the user is:
    a home address; or
    a work address.

19. The computer of claim 11, further comprising:
    receiving a response from the user verifying the transaction; and
    adding the current route as another established route.

20. A non-transitory computer-readable medium having instructions stored thereon that is executable by a computing system to perform operations comprising:
    determining a match score indicative of similarities between (1) signal information associated with a current route being traveled by a user in connection with a transaction with a merchant and (2) signal information associated with an established route traveled by the user in connection with a previous transaction between the user and the merchant, wherein the signal information comprises signal signatures that identify one or more signal emitters identified along each route;
    determining whether the current route matches the established route based on whether the match score is above a threshold; and
    if the match score is below the threshold, transmitting a message indicating that the user was not authenticated.

* * * * *